United States Patent
Kim et al.

(10) Patent No.: US 8,798,259 B2
(45) Date of Patent: Aug. 5, 2014

(54) METHOD FOR MANAGING COMMUNICATION RECORD AND COMMUNICATION DEVICE PERFORMING THE SAME

(75) Inventors: Hye Yeon Kim, Suwon-si (KR); Hae Moon Kwon, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 13/079,171

(22) Filed: Apr. 4, 2011

(65) Prior Publication Data

US 2011/0248849 A1    Oct. 13, 2011

(30) Foreign Application Priority Data

Apr. 13, 2010  (KR) .................. 10-2010-0033884

(51) Int. Cl.
    *H04M 3/00*    (2006.01)
(52) U.S. Cl.
    USPC ................. 379/355.02; 379/355.09
(58) Field of Classification Search
    USPC ............. 379/88.11, 355.01, 355.02, 355.05, 379/355.07, 355.09
    See application file for complete search history.

(56) References Cited

U.S. PATENT DOCUMENTS

| | | | | |
|---|---|---|---|---|
| 5,377,354 A * | 12/1994 | Scannell et al. | ............ | 718/103 |
| 5,694,616 A * | 12/1997 | Johnson et al. | ............ | 709/207 |
| 6,351,764 B1 * | 2/2002 | Voticky et al. | ............ | 709/207 |
| 6,396,513 B1 * | 5/2002 | Helfman et al. | ............ | 715/752 |
| 7,203,288 B1 * | 4/2007 | Dwyer et al. | ............ | 379/88.23 |
| 7,362,854 B2 * | 4/2008 | Mcknight | ............ | 379/210.01 |
| 7,499,538 B2 * | 3/2009 | Kusaka et al. | ............ | 379/355.09 |
| 7,587,461 B2 * | 9/2009 | Baluja et al. | ............ | 709/207 |
| 7,809,794 B2 * | 10/2010 | Fellenstein et al. | ............ | 709/206 |
| 7,817,790 B2 * | 10/2010 | Sanmugasuntharam et al. | ............ | 379/142.06 |
| 7,827,232 B2 * | 11/2010 | Bear et al. | ............ | 709/203 |
| 8,037,146 B2 * | 10/2011 | Carr et al. | ............ | 709/206 |
| 8,068,604 B2 * | 11/2011 | Leeds et al. | ............ | 379/373.04 |
| 8,204,192 B1 * | 6/2012 | Suhail et al. | ............ | 379/142.06 |
| 2006/0282503 A1 * | 12/2006 | Gwozdz | ............ | 709/206 |
| 2008/0057926 A1 * | 3/2008 | Forstall et al. | ............ | 455/415 |
| 2008/0126951 A1 * | 5/2008 | Sood et al. | ............ | 715/752 |
| 2009/0037350 A1 * | 2/2009 | Rudat | ............ | 706/11 |
| 2009/0144655 A1 * | 6/2009 | Hardy et al. | ............ | 715/803 |
| 2010/0077041 A1 * | 3/2010 | Cowan et al. | ............ | 709/206 |
| 2010/0191818 A1 * | 7/2010 | Satterfield et al. | ............ | 709/206 |
| 2010/0330972 A1 * | 12/2010 | Angiolillo | ............ | 455/418 |
| 2011/0076989 A1 * | 3/2011 | Lynch | ............ | 455/412.1 |

* cited by examiner

*Primary Examiner* — Olisa Anwah
(74) *Attorney, Agent, or Firm* — Jefferson IP Law, LLP

(57) ABSTRACT

A communication device and method for managing communication records by using priorities of the communication records so that a user can easily find a desired communication record are provided. In the method, the device receives a priority input for a selected one of the communication records, saves the received priority input as a priority of the selected communication record, and displays a list of the communication records arranged according to the priorities thereof.

14 Claims, 10 Drawing Sheets

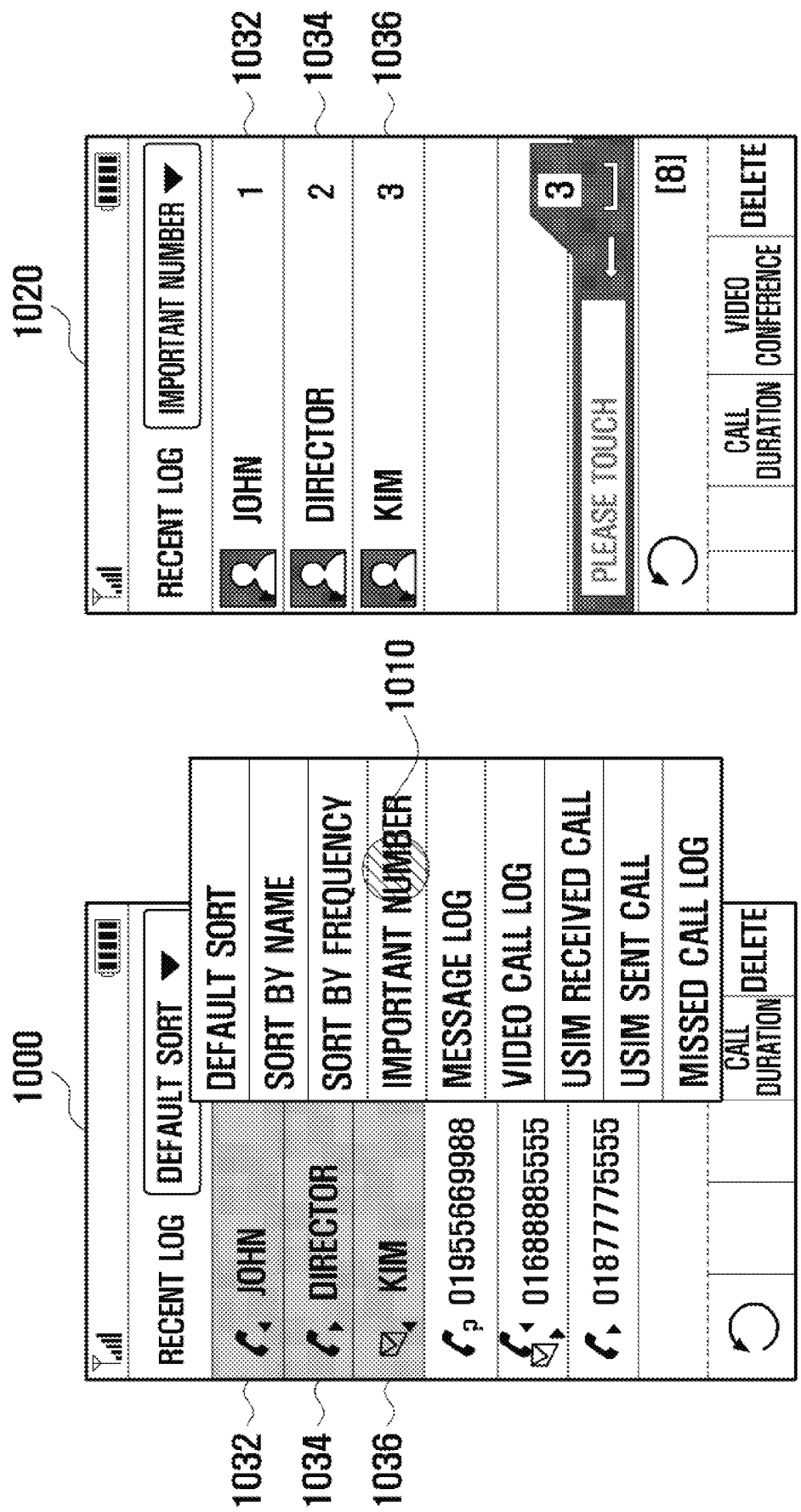

METHOD FOR MANAGING COMMUNICATION RECORD AND COMMUNICATION DEVICE PERFORMING THE SAME

PRIORITY

This application claims the benefit under 35 U.S.C. §119(a) of a Korean patent application filed on Apr. 13, 2010 in the Korean Intellectual Property Office and assigned Serial No. 10-2010-0033884, the entire disclosure of which is hereby incorporated by reference.

BACKGROUND OF THE INVENTION

1. Field of the Invention

The present invention relates to management of communication records in a communication device. More particularly, the present invention relates to a communication device and method for managing communication records by using priorities of communication records.

2. Description of the Related Art

Nowadays, mobile communication terminals and other communication devices offer, in the form of one or more lists, communication records about received calls or messages, sent calls or messages, missed calls, blocked calls or spam, and the like. Normally, in such a list, the communication records are temporally arranged, for example with the most recently logged call being listed first. Additionally, communication records may be arranged in order of frequency, name or number.

These communication records may be useful when a user desires to again make contact with the other party of a past call or message. However, if a list contains a great number of communication records, a user may have difficulty in finding a desired communication record. In addition, a conventional list of communication records may fail to distinguish relatively important records from the others.

SUMMARY OF THE INVENTION

An aspect of the present invention is to address at least the above-mentioned problems and/or disadvantages and to offer at least the advantages described below. Accordingly, an aspect of the present invention is to provide a new approach to management of communication records in a communication device so that a user can easily find a desired communication record.

According to an aspect of the present invention, a method for managing communication records in a communication device is provided. The method includes receiving a priority input for a selected one of the communication records, saving the received priority input as a priority of the selected communication record, and displaying a list of the communication records arranged according to the priorities thereof.

According to another aspect of the present invention, a communication device is provided. The device includes, an input unit configured to receive a user's input, a memory unit configured to store priorities of communication records, a display unit configured to display a list of the communication records, and a control unit configured to control the input unit to receive a priority input for a selected one of the communication records, to control the memory unit to save the received priority input as the priority of the selected communication record, and to control the display unit to display the list of the communication records arranged according to the priorities thereof.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 10 is a view illustrating a display screen for a list of communication records in accordance with another exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
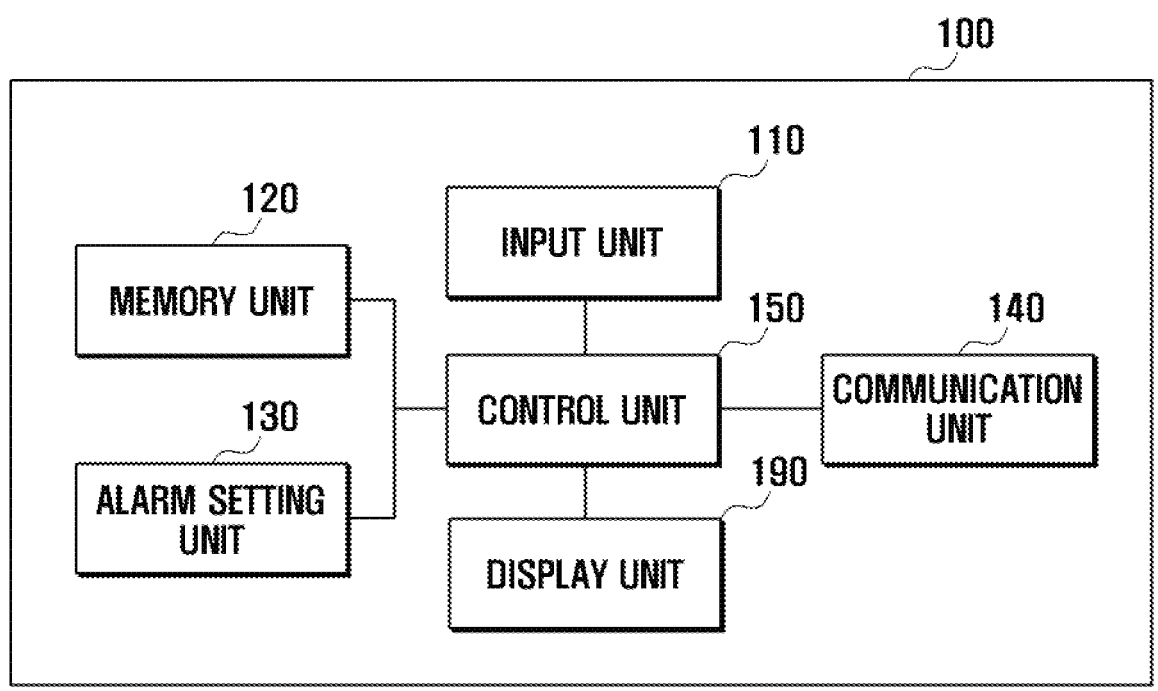
FIG. 1 is a block diagram illustrating the configuration of a communication device in accordance with an exemplary embodiment of the present invention.

FIG. 1 is a block diagram illustrating the configuration of a communication device in accordance with an exemplary embodiment of the present invention.

Referring to FIG. 1, the communication device 100 includes an input unit 110, a memory unit 120, an alarm setting unit 130, a communication unit 140, a control unit 150, and a display unit 190.

The input unit 110 receives a user's input and sends it to the control unit 150. The input unit 110 may be formed of a touch screen, a keypad, or any of various input interfaces. More particularly, the input unit 110 may allow a priority input, an alarm input, and a memo input. Related descriptions regarding such input types will be given below with reference to FIGS. 2 to 8.

The memory unit 120 stores the priorities of communication records. Herein, communication records may include various logs of voice calls, video calls or messages which are sent, received, blocked, or missed. A priority input of a selected communication record is received through the input unit 110. When the input unit 110 sends a priority input to the control unit 150, the memory unit 120 stores the priority of a selected communication record under the control of the control unit 150. Also, the memory unit 120 may store memos correlated with communication records. When the input unit 110 sends a memo input for a selected communication record to the control unit 150, the memory unit 120 stores a memo in connection with a selected communication record under the control of the control unit 150. Related descriptions regarding the memory unit 120 will be given below with reference to FIGS. 2 to 8.

The alarm setting unit 130 stores alarm conditions correlated with communication records. When the input unit 110 receives an alarm input for a selected communication record and sends it to the control unit 150, the alarm setting unit 130 stores the alarm input as alarm conditions in connection with a selected communication record under the control of the control unit 150. When the time designated by an alarm condition arrives, the alarm setting unit 130 offers a specific alarm to a user. Related descriptions regarding the alarm setting unit 130 will be given below with reference to FIGS. 2 to 7.

The communication unit 140 sends and receives packets to and from external entities such as a base station. These packets may be used for a voice call, a call connection request, a video call, a message transmission, or a data communication. The communication unit 140 may perform a communication through well-known wired or wireless communication systems based on their specific protocols that are well known in the art.

The display unit 190 displays a list of communication records thereon. The display unit 190 may display a communication record list in which communication records are arranged according to their priorities. Also, the display unit 190 may display a communication record list in which communication records with priorities are distinguished from others with no priority. And, at a user's request, the display unit 190 may display a communication record list which contains only communication records with priorities. Meanwhile, the display unit 190 may offer an interface screen used for a user's input. Related descriptions regarding the display unit 190 will be given below with reference to FIGS. 9 and 10.

The control unit 150 receives a user's input from the input unit 110 and, depending on the received input, controls the memory unit 120, the alarm setting unit 130 and the display unit 190. Related descriptions regarding the control unit 150 will be given below with reference to FIGS. 2 to 10.

Figure 2:
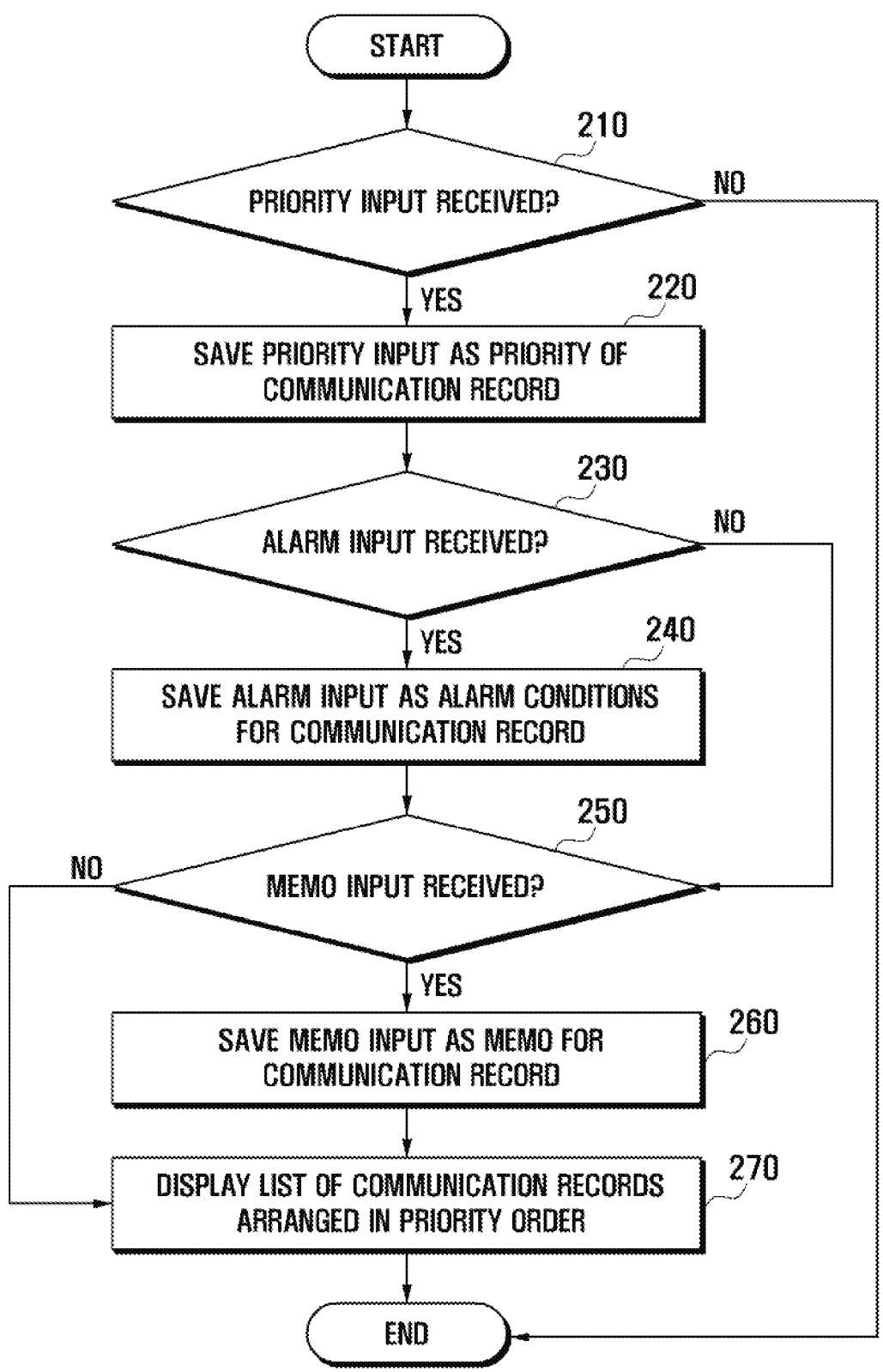
FIG. 2 is a flow diagram illustrating a method for managing communication records in a communication device in accordance with an exemplary embodiment of the present invention.

FIG. 2 is a flow diagram illustrating a method for managing communication records in a communication device in accordance with an exemplary embodiment of the present invention.

Referring to FIG. 2, the control unit 150 determines whether the input unit 110 receives a priority input for a communication record in step 210. As discussed above, when receiving any input, the input unit 110 sends it to the control unit 150.

Figure 3:
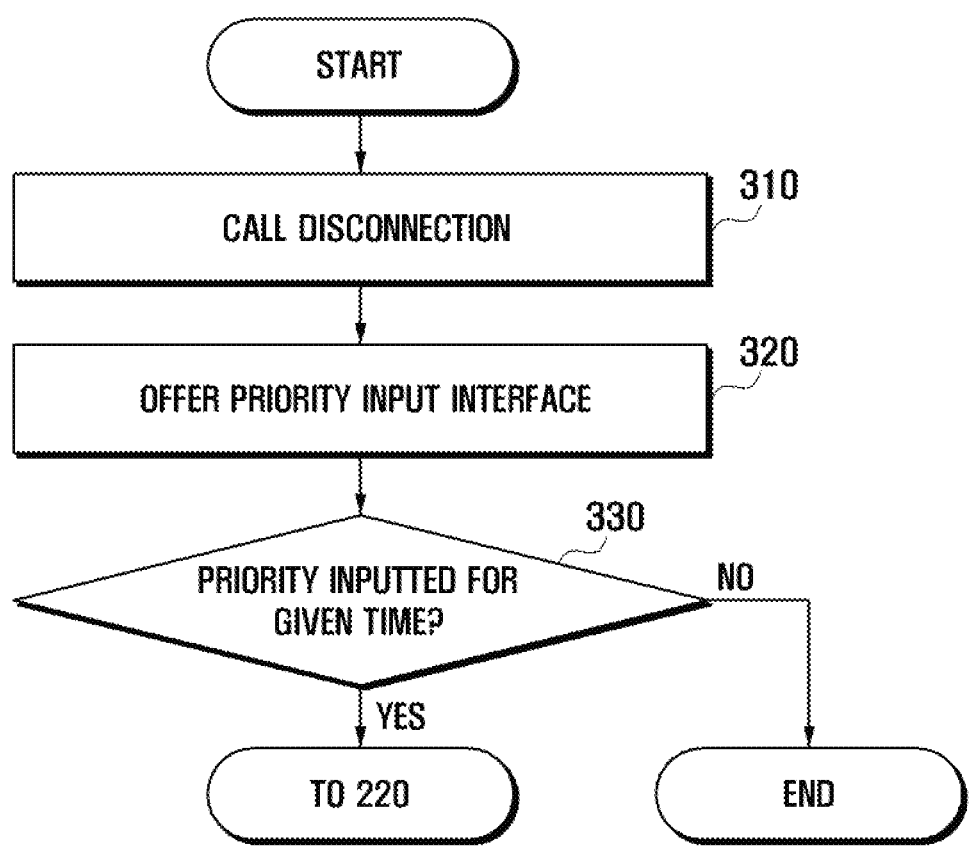
FIG. 3 is a flow diagram illustrating a process of inputting the priorities of communication records in accordance with an exemplary embodiment of the present invention.
Figure 4:
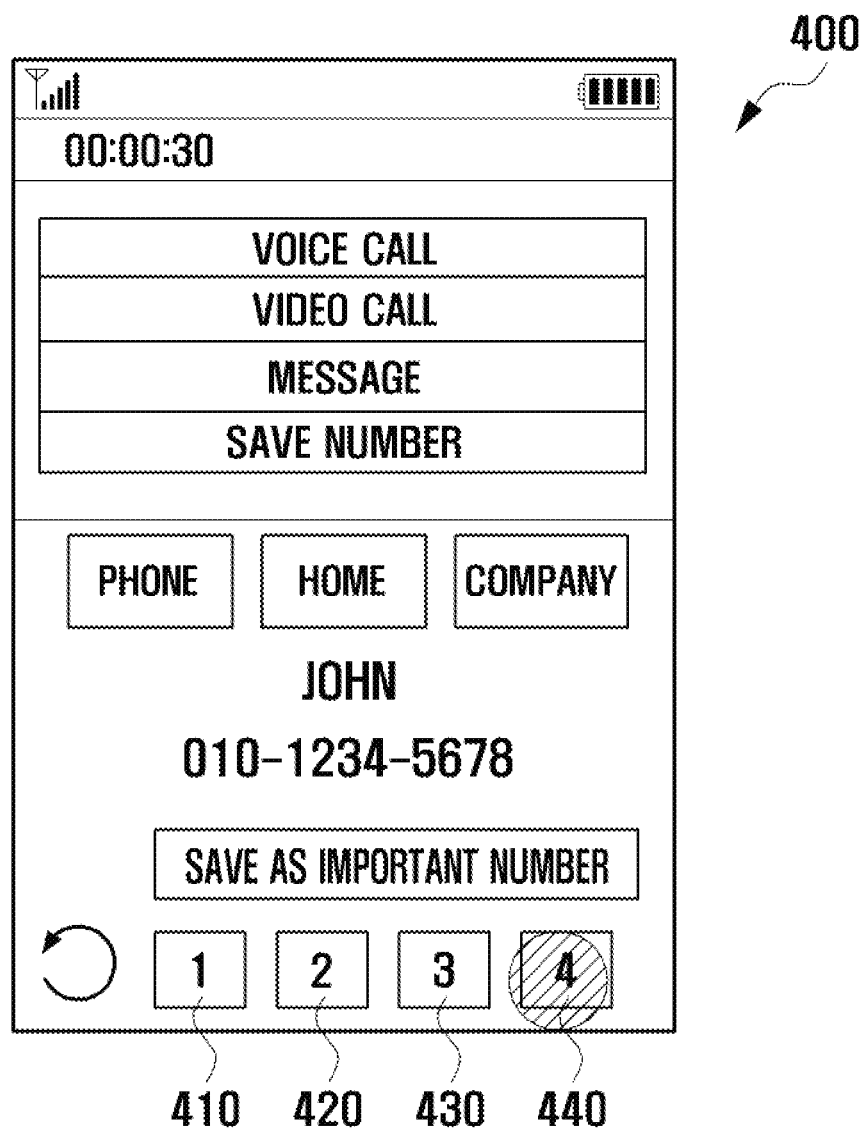
FIG. 4 is a view illustrating a priority input interface in accordance with an exemplary embodiment of the present invention.

FIG. 3 is a flow diagram illustrating a process of inputting the priorities of communication records in accordance with an exemplary embodiment of the present invention. FIG. 4 is a view illustrating a priority input interface in accordance with an exemplary embodiment of the present invention.

In an exemplary embodiment shown in FIGS. 3 and 4, a user may input a priority through a suitable interface offered after a current call is disconnected.

Referring to FIG. 3, a current call is disconnected in step 310. For purposes of this explanation, it may be assumed that the other party of the disconnected call is 'John' with a phone number '010-1234-5678'.

The communication device 100 offers a priority input interface to a user through the input unit 110 and the display unit 190 in step 320. For instance, a screen 400 shown in FIG. 4 is an interface screen offered by the display unit 190.

The control unit 150 determines whether the input unit 110 receives a priority input within a predefined time after a call disconnection in step 330. If it is determined in step 330 that the input unit 110 receives a priority input within the predefined time, the control unit 150 proceeds to step 220 shown in FIG. 2. On the other hand, if it is determined in step 330 that no priority input is received within the predefined time after a call disconnection, the memory unit 120 stores a communication record of a current call (i.e., a call disconnected in step 310) without priority (i.e., with the lowest priority). More specifically, the interface screen 400 shown in FIG. 4 is displayed for a given time and then automatically changed to the initial screen or the previous screen (such as a menu screen or a communication record list screen) displayed before a current call. Additionally, if there is no priority input for a given time, the memory unit 120 stores a communication record of a current call without priority.

The interface screen 400 shown in FIG. 4 offers in a visual manner four buttons 410, 420, 430 and 440 at a lower part thereof. If the input unit 110 is formed of a touch screen, a user may input a priority by touching or pressing one of the buttons 410, 420, 430 and 440. Each of the buttons 410, 420, 430 and 440 has the number 1, 2, 3 or 4 which is displayed thereon and stands for a priority. For example, when a user touches or presses the fourth button 440 with the number 4 on the interface screen 400, the input unit 110 receives a user's manipulation as a priority input and then sends it to the control unit 150. After receiving a priority input '4', the control unit 150 performs step 220 so that the memory unit 120 stores the input data '4' as the priority of a communication record regarding a current call under the control of the control unit 150.

The above discussion is based on the assumption that the input unit 110 is formed of a touch screen. Alternatively, the input unit 110 may be formed of a keypad. In this case, a user may press a number arranged on a keypad while the interface screen 400 is displayed. Then the input unit 110 receives the pressed number as a priority input. For example, when the number '1' on a keypad is pressed, the input unit 110 receives a priority input '1'. Even in case of a keypad, a process after the input unit 110 receives a priority input may be the same as discussed above.

Meanwhile, through a similar process shown in FIGS. 3 and 4, a priority input for a selected communication record may be canceled. When a priority input is canceled, the priority is regarded as the lowest priority.

Figure 5:
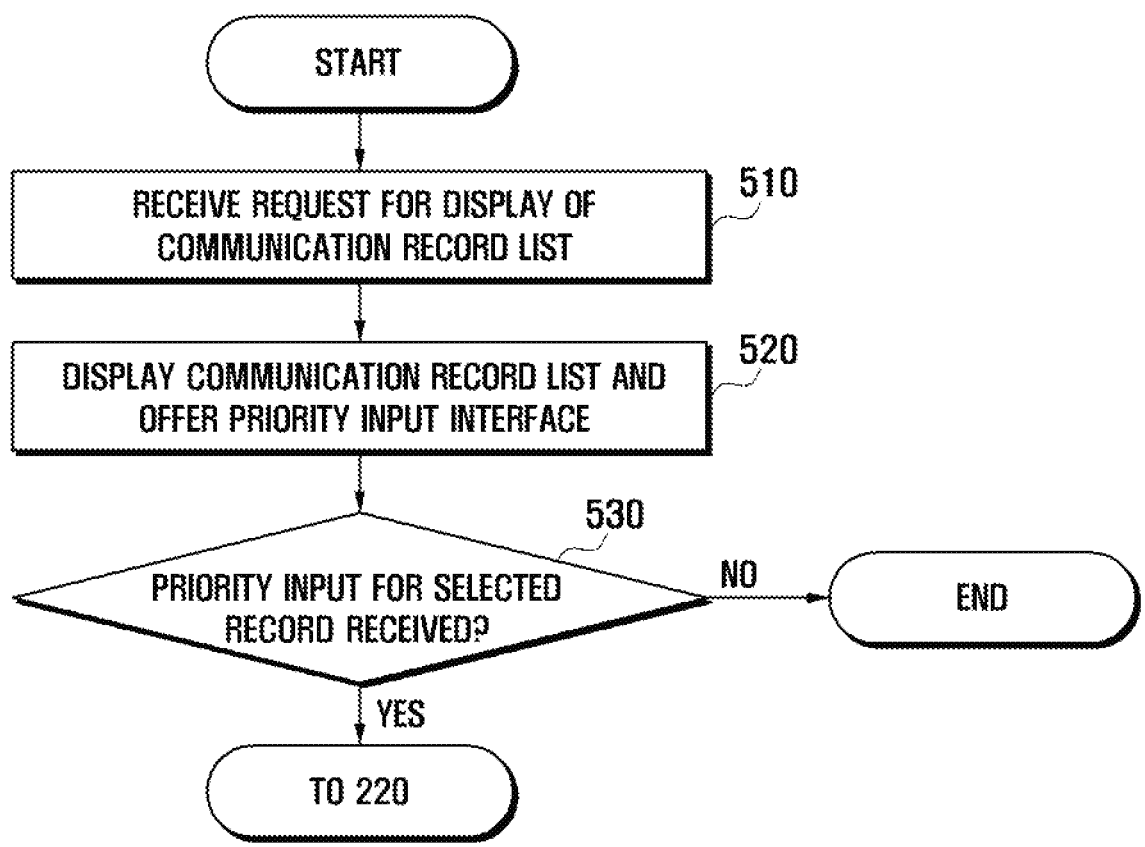
FIG. 5 is a flow diagram illustrating a process of inputting the priority of a communication record in accordance with an exemplary embodiment of the present invention.
Figure 6:
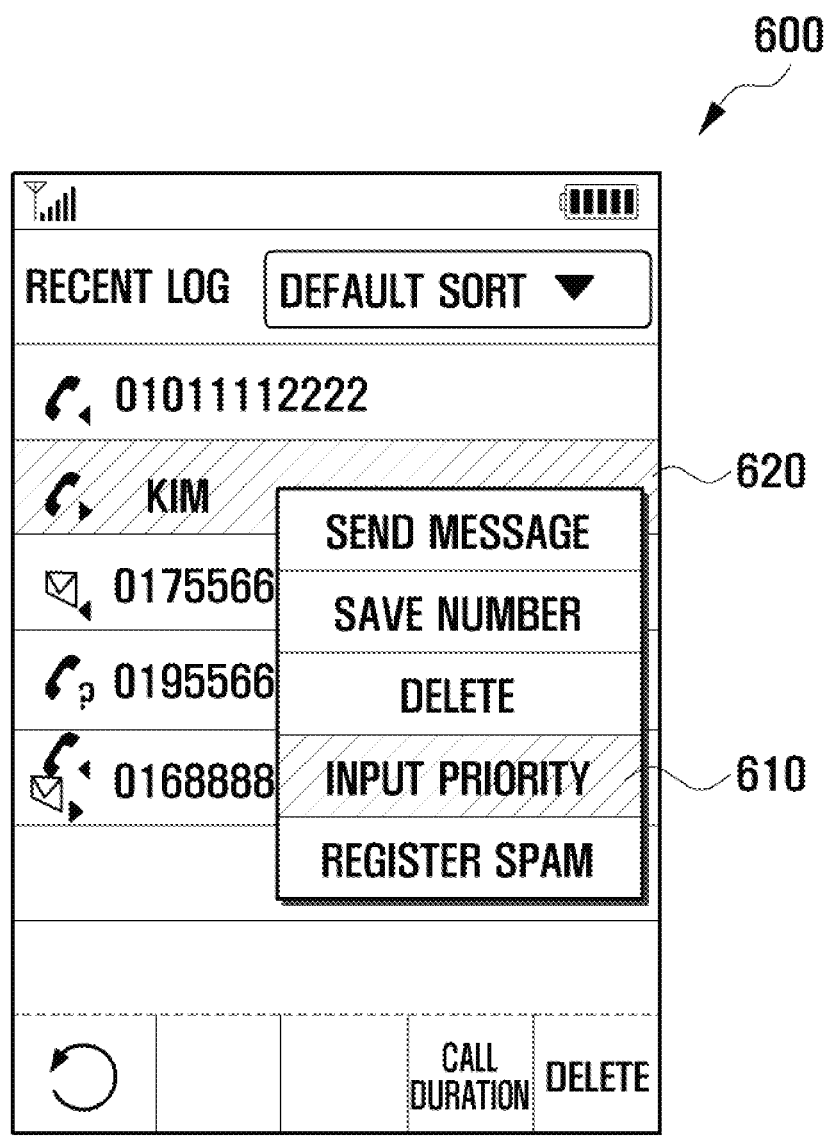
FIG. 6 is a view illustrating a priority input interface in accordance with an exemplary embodiment of the present invention.

FIG. 5 is a flow diagram illustrating a process of inputting the priority of a communication record in accordance with an exemplary embodiment of the present invention. FIG. 6 is a view illustrating a priority input interface in accordance with an exemplary embodiment of the present invention.

In an exemplary embodiment shown in FIGS. 5 and 6, a user may input a priority through a suitable interface that displays a list of communication records.

Referring to FIG. 5, the input unit 110 receives a request for a display of a communication record list in step 510. For instance, when a call button of the communication device 100 is pressed, the input unit 110 may receive this press input as a request for displaying a list of communication records.

The input unit 110 sends a received request to the control unit 150. When receiving a request for a display of a communication record list, the control unit 150 may control the display unit 190 to display a list of communication records and control both the input unit 110 and the display unit 190 to offer a priority input interface in step 520. An exemplary screen 600 of this priority input interface is shown in FIG. 6 described below.

Next, the control unit 150 determines whether a communication record is selected in the displayed list of communication records and whether the input unit 110 receives a priority input for the selected communication record in step 530. If so, the control unit 150 performs the next step 220 shown in FIG. 2 and saves the received input as the priority of the selected communication record. If no communication record is selected or if no priority input is received, a process of managing priorities is ended without variations in priorities.

Referring to FIG. 6, an exemplary process in which a user inputs a priority through the input unit 110 is as follows. A user may invoke a pop-up menu by selecting a communication record 620 in a list of communication records and then select the menu item 'input priority' 610 in the pop-up menu. The selection of communication records or menu items may be made through a touch screen or a keypad. After the menu item 'input priority' 610 is selected, another interface similar to screen 400 shown in FIG. 4 may be offered to a user. On such an interface, a user may input a priority for the selected communication record 620 through a touch screen or a keypad. Besides an exemplary embodiment shown in FIG. 6, the input unit 110 may receive a priority input through any other various ways.

Returning back to FIG. 2, in step 210, the control unit 150 determines whether the input unit 110 receives a priority input for a communication record as mentioned above. Although this step 210 may be performed as discussed above and as shown in FIGS. 3 to 6, the present invention is not limited to such embodiments. Alternatively, step 210 may be performed through any other embodiments. If the input unit 110 receives a priority input for a communication record, step 220 is performed. However, if the input unit 110 fails to receive a priority input, a managing process is ended.

In the step 220, the control unit 150 controls the memory unit 120 so that the memory unit 120 stores the priority of a selected communication record according to a priority input. In an example shown in FIG. 4, the number '4' of the selected button 440 in the screen 400 is a priority input and therefore the fourth priority is assigned to a communication record regarding a current call (which has just been disconnected) with John whose phone number is 010-1234-5678. In another example shown in FIG. 6, a priority input is assigned to the priority of the selected communication record 620 in a list.

Next, the control unit 150 determines whether the input unit 110 receives an alarm input for a communication record in step 230.

Figure 7:
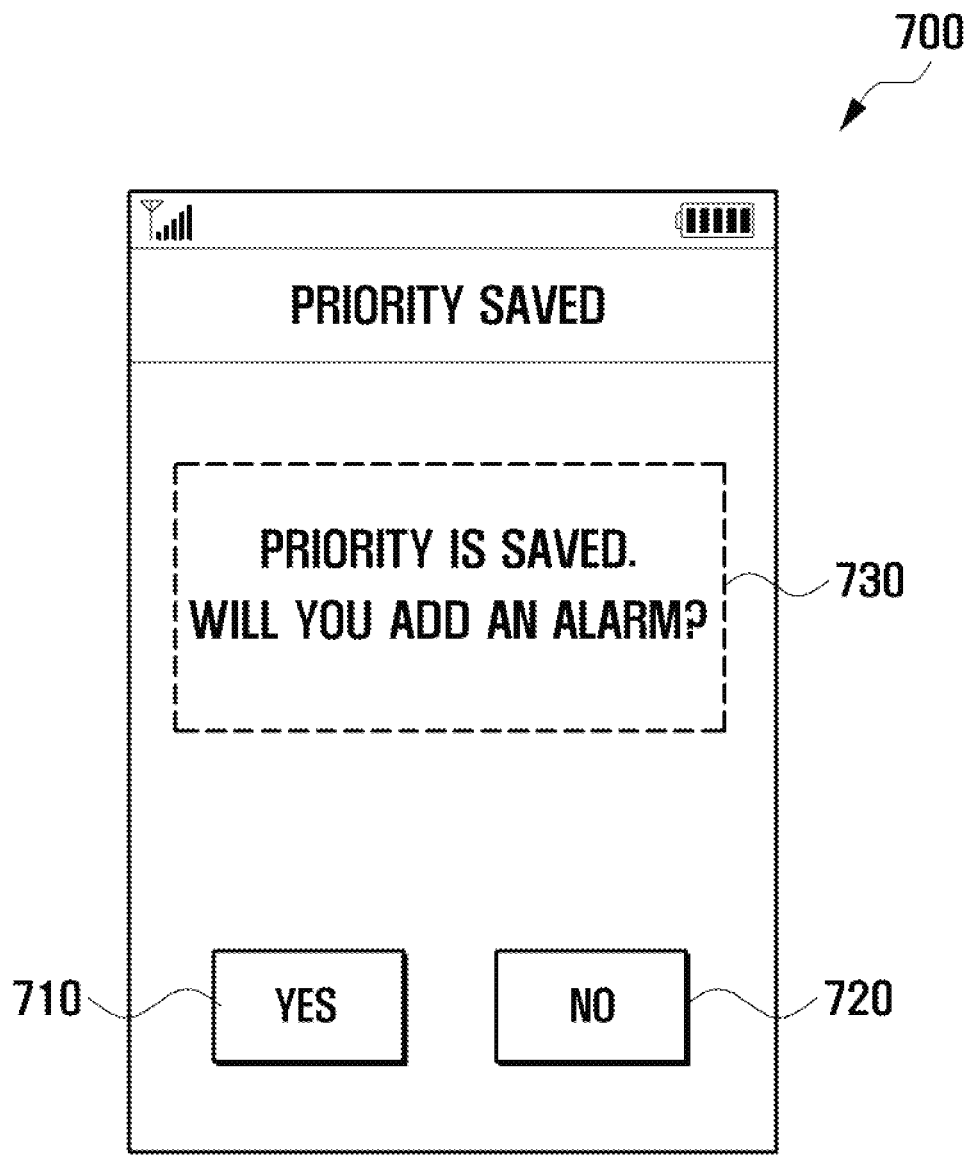
FIG. 7 is a view illustrating an alarm input interface screen in accordance with an exemplary embodiment of the present invention.

FIG. 7 is a view illustrating an alarm input interface screen in accordance with an exemplary embodiment of the present invention.

After step 220, namely, after the inputted priority is saved, the display unit 190 and the input unit 110 offer an alarm input interface screen 700 as shown in FIG. 7. This interface screen 700 offers in a visual manner two buttons 710 and 720 and a message 730. Here, this message 730 that appears in the interface screen 700 may be to ask a user if he or she will add an alarm to the selected communication record. The user may touch or press the first button 710 to add an alarm or may touch or press the second button 720 not to add an alarm.

If the first button 710 is selected, the control unit 150 recognizes that the input unit 110 receives an alarm input for a communication record, and performs step 240. However, if the second button 720 is selected, the control unit 150 recognizes that the input unit 110 receives no alarm input, and performs step 250.

In step 240, the control unit 150 controls the alarm setting unit 130 so that the alarm setting unit 130 stores alarm conditions of a selected communication record according to a received alarm input. Here, a selected communication record may be a communication record of a current call that has just been disconnected, as discussed above in FIG. 4, or may be a selected communication record 620 as discussed above in FIG. 6. When the first button 710 is selected, the alarm setting unit 130 may set the alarm time of a selected communication record for a predefined time, for example, ten minutes from the time when the first button 710 is selected. In another exemplary embodiment, when the first button 710 is selected, an alarm input interface may be offered to allow a user to enter a desired alarm time. When the time designated by alarm conditions arrives, the alarm setting unit 130 may offer a specific alarm to a user in various manners such as a vibration, a ring tone, a twinkle on a screen, or the like. If a user selects a call button while an alarm is offered, the communication device 100 may try to connect a call with the other party of the current communication record to which the alarm is added, or may perform any other function such as transmission of a message through further manipulations.

Alarm input interfaces as shown in FIG. 7 are not essential for the present invention. An alarm input interface may be offered together with a priority input interface shown in FIGS. 3 and 4 or may be offered in a similar form in comparison with a priority input interface shown in FIGS. 5 and 6.

In the step 250, the control unit 150 determines whether the input unit 110 receives a memo input for a communication record. If a memo input is received, step 260 is performed. However, if there is no memo input, step 270 is performed.

Figure 8:
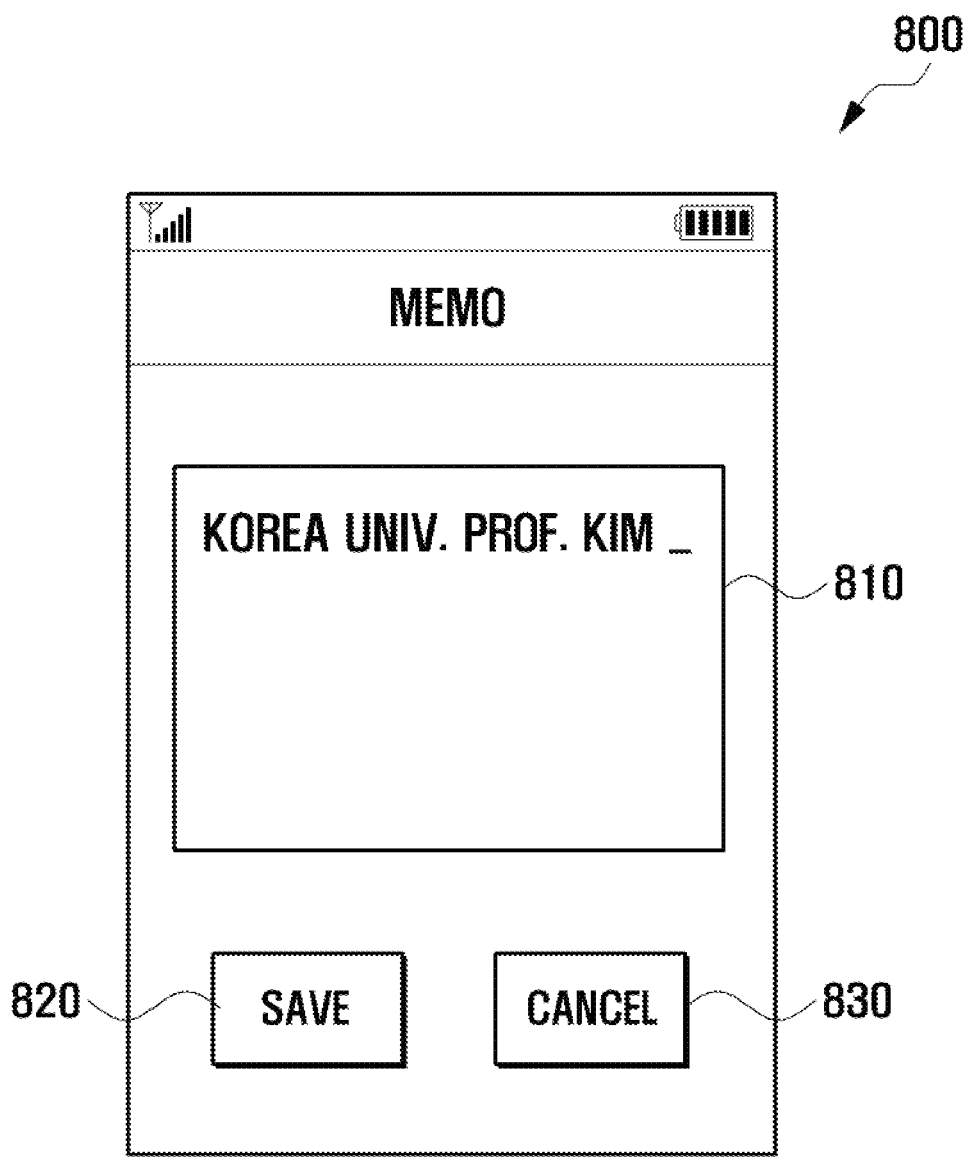
FIG. 8 is a view illustrating a memo input interface screen in accordance with an exemplary embodiment of the present invention.

FIG. 8 is a view illustrating a memo input interface screen in accordance with an exemplary embodiment of the present invention.

The communication device 100 may offer a memo input interface similar with an interface shown in FIG. 7 so that a user can selectively save a memo. Also, the communication device 100 may offer a memo input interface in a manner similar with as those discussed in FIGS. 3 to 6.

Referring to FIG. 8, a memo input interface screen 800 may be provided with which a user may enter a text-type memo in a memo input window 810 and touch or press a save button 820. The control unit 150 controls the memory unit 120 so that the inputted memo is saved as a memo for a selected communication record. If a user touches or presses a cancel button 830, a memo input is not saved. Thereafter, a saved memo may be offered to a user at a user's request.

In addition to an exemplary text-type memo input as shown in FIG. 8, the communication device 100 may allow, as other types of a memo input, an image input through a touch screen, a photo input through a camera module, and the like. More particularly, a voice input may be saved as a memo for a communication record. In this case, a user can easily enter a memo by means of a voice after a call is disconnected. For saving and replaying a voice memo, the communication device 100 may further have an audio processing module, a microphone, and a speaker.

In step 270, the display unit 190 displays a list of communication records according to the priorities of the communication records. As an example, in a displayed list, communication records may be arranged in descending order of priority. In brief, after the priorities of communication records are set through the aforesaid steps 210 to 260, the communication device 100 may offer, at a user's request, a communication record list in which communication records are arranged according to their priorities.

Figure 9:
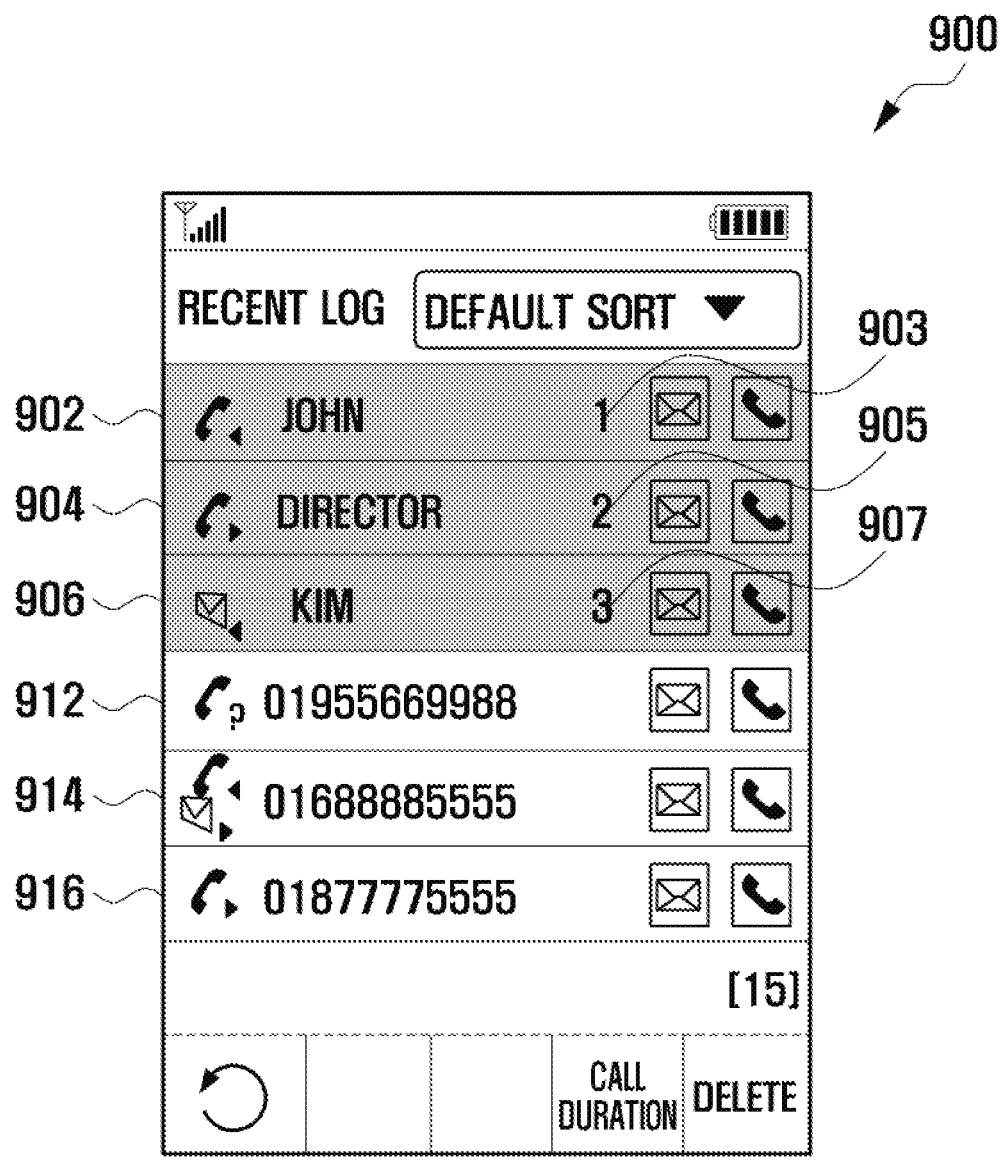
FIG. 9 is a view illustrating a display screen for a list of communication records in accordance with an exemplary embodiment of the present invention.

FIG. 9 is a view illustrating a display screen for a list of communication records in accordance with an exemplary embodiment of the present invention.

Referring to FIG. 9, in a list display screen 900, three call logs 902, 904 and 906 have their priorities 903, 905 and 907, respectively, whereas the other call logs 912, 914 and 916 have no priority. Namely, a call log 902 with John has the first priority, a call log 904 with director has the second priority, a call log 906 with Kim has the third priority, and the other call logs 912, 914 and 916 have the lowest priority. In this case, the control unit 150 arranges communication records in descending order of priority and outputs them to the display unit 190. Call logs with the same priority may be arranged in order from a more recent call, may be arranged alphabetically, and the like.

Also, the display unit 190 may display a communication record list so that communication records with priorities are distinguished from others with no priority. Communication records with no priority are caused by a failure in receiving any priority input and thus regarded as having the lowest priority. As shown, communication records 902, 904 and 906 with priorities may be highlighted or expressed in different colors to distinguish them from the other communication records 912, 914 and 916 with no priority. Alternatively, a graphical object such as an icon or numerals may be used in a list to indicate the priorities of communication records and to distinguish communication records with priorities from others with no priority.

Also, the display unit 190 may display a communication record list so that communication records with memos may be distinguished from the others with no memo. For instance, in a list, an icon or image such as a memo paper may be used for communication records with memos to distinguish them from others with no memo. Alternatively, the text "memo", numerals, shading effects, different font colors, or any other equivalents may be used to distinguish communication records with memos from the others with no memo. When the input unit 110 receives a touch input on an icon representing memos or receives other input to request a memo display, the display unit 190 may display the content of a selected memo added to a communication record. Therefore, by using such an interface, a user can easily retrieve memos previously input and evoke respective communication records from the memos.

FIG. 10 is a view illustrating a display screen for a list of communication records in accordance with another exemplary embodiment of the present invention.

Referring to FIG. 10, depending on a user's menu selection or input, the display unit 190 may display a communication record list that contains only communication records with priorities. For instance, when a user selects a menu item 1010 indicating important numbers in a display screen 1000 representing a list of communication records regardless of priority, important numbers only are chosen from a list and displayed. Namely, the display unit 190 may offer another display screen 1020 that represents a list that contains only communication records 1032, 1034 and 1036 with priorities.

Among the above-discussed steps shown in FIG. 2, both of an alarm input process (i.e., steps 230 and 240) and a memo input process (i.e., steps 250 and 260) may be selectively performed or none of them may be performed.

An exemplary embodiment of the present invention is described hereinafter with reference to flowchart illustrations of user interfaces, methods, and computer program products. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Furthermore, each block of the flowchart illustrations may represent a module, segment, or portion of code, which comprises one or more executable instructions for implementing the specified logical function(s). It should also be noted that in some alternative implementations, the functions noted in the blocks may occur out of the order specified. For example, two blocks shown in succession may in fact be executed substantially concurrently or the blocks may sometimes be executed in the reverse order, depending upon the functionality involved.

The term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and be configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for managing communication records in a communication device, the method comprising:
    selecting a communication record from among the communication records;
    receiving a priority input for the selected communication record;
    composing a list of the selected communication record and a list of an unselected communication record; and
    displaying at least one of the list of the selected communication record and the list of the unselected communication record,
    wherein the receiving of the priority input comprises:
        displaying a priority input interface for a predefined time after a disconnection of a current call; and
        receiving the priority input for the current call within the predefined time through the priority input interface.

2. The method of claim 1, further comprising:
    saving the received priority input as the priority;
    receiving an alarm input for the selected communication record;
    saving the received alarm input as an alarm condition for the selected communication record; and
    providing a specific alarm at a time designated by the alarm condition.

3. The method of claim 1, wherein the displaying of the at least one of the list of the selected communication record and the list of the unselected communication record includes displaying the list of the selected communication record with priorities distinguished from the list of the unselected communication record with no priority.

4. The method of claim 1, wherein the displaying of the at least one of the list of the selected communication record and the list of the unselected communication record includes displaying the list of the selected communication record with priorities.

5. The method of claim 1, further comprising:
    after saving the received priority input as the priority, receiving a memo input for the selected communication record; and
    saving the received memo input as a memo for the selected communication record.

6. The method of claim 5, wherein the memo input includes a voice memo input.

7. The method of claim 1, wherein the receiving of the priority input includes:
    displaying a priority input interface allowing for selection of one of the communication records in the list and allowing for input of the priority of the selected communication record; and
    receiving the priority input through the priority input interface.

8. A communication device for managing communication records, the device comprising:
    an input unit configured to receive a user's input;
    a memory unit configured to store priorities of the communication records;
    a display unit configured to display a list of the communication records; and
    a control unit configured to select a communication record from among the communication records in response to the user's input, to control the input unit to receive a priority input for the selected communication record, to compose a list of the selected communication record and a list of an unselected communication record, and to control the display unit to display at least one of the list of the selected communication record and the list of the unselected communication record,
    wherein the input unit is further configured to receive the priority input for a current call through a priority input interface that is offered for a predefined time after a disconnection of the current call.

9. The device of claim 8, further comprising:
    an alarm setting unit configured to, when the input unit receives an alarm input for the selected communication record, save the received alarm input as an alarm condition for the selected communication record, and to provide a specific alarm at a time designated by the alarm conditions.

10. The device of claim 8, wherein the display unit is further configured to display the list of the selected communication record with priorities distinguished from the list of the unselected communication record with no priority.

11. The device of claim 8, wherein the display unit is further configured to display the at least one of the list of the selected communication record and the list of the unselected communication record by displaying the selected communication record with priorities.

12. The device of claim 8, wherein the memory unit is further configured to, when the input unit receives a memo input for the selected communication record, to save the received memo input as a memo for the selected communication record.

13. The device of claim 12, wherein the memo input includes a voice memo input.

14. The device of claim 8, wherein the input unit is further configured to receive the priority input through a priority input interface that allows for selection of one of the communication records in the list and allows for input of the priority of the selected communication record.

* * * * *